United States Patent [19]
Westerdale

[11] 3,760,617
[45] Sept. 25, 1973

[54] ANTI-THEFT CABLE RETRACTOR FOR HOOD LATCH RELEASE

[75] Inventor: Paul A. Westerdale, Riverview, Mich.

[73] Assignee: Ford Motor Company, Dearborn, Mich.

[22] Filed: May 8, 1972

[21] Appl. No.: 251,312

[52] U.S. Cl. .................................... 70/1.5, 70/256
[51] Int. Cl. .......................................... E05b 65/19
[58] Field of Search ...................... 70/1.5, 256, 257; 292/125, 171, 225, DIG. 25

[56] References Cited
UNITED STATES PATENTS

| | | | |
|---|---|---|---|
| 1,940,979 | 12/1933 | Staples | 70/247 |
| 2,084,045 | 6/1937 | Olsen | 220/86 |
| 2,316,692 | 4/1943 | Hill | 292/171 |

*Primary Examiner*—Albert G. Craig, Jr.
*Attorney*—Keith L. Zerschling et al.

[57] ABSTRACT

In combination, a latch mechanism adapted to be mounted interiorly of a compartment for latching engagement with a closure. A Bowden cable coupled to the latch mechanism and extending exteriorly of the compartment through a wall of the latter is coupled to an operating means, such as a handle or the like. The operating means is operable to actuate the cable means in latch mechanism release direction and to limit movement of the cable means in a direction opposite to the latch release direction. A key-operated locking means is engaged with the cable means between the compartment wall and the operating means for selectively blocking actuation of the cable means.

The combination is characterized in that a biasing means is coupled to the cable means contiguous to the latch mechanism. The biasing means normally urges the cable means in the direction opposite to latch mechanism release direction. If this cable is severed between the compartment wall and the key-operated locking mans, as by someone attempting to bypass the lock, the biasing means then becomes effective to draw the movable element of the Bowden cable through the compartment wall into the compartment thereby rendering the cable means inaccessible for latch mechanism release manipulation.

6 Claims, 4 Drawing Figures

PATENTED SEP 25 1973 3,760,617
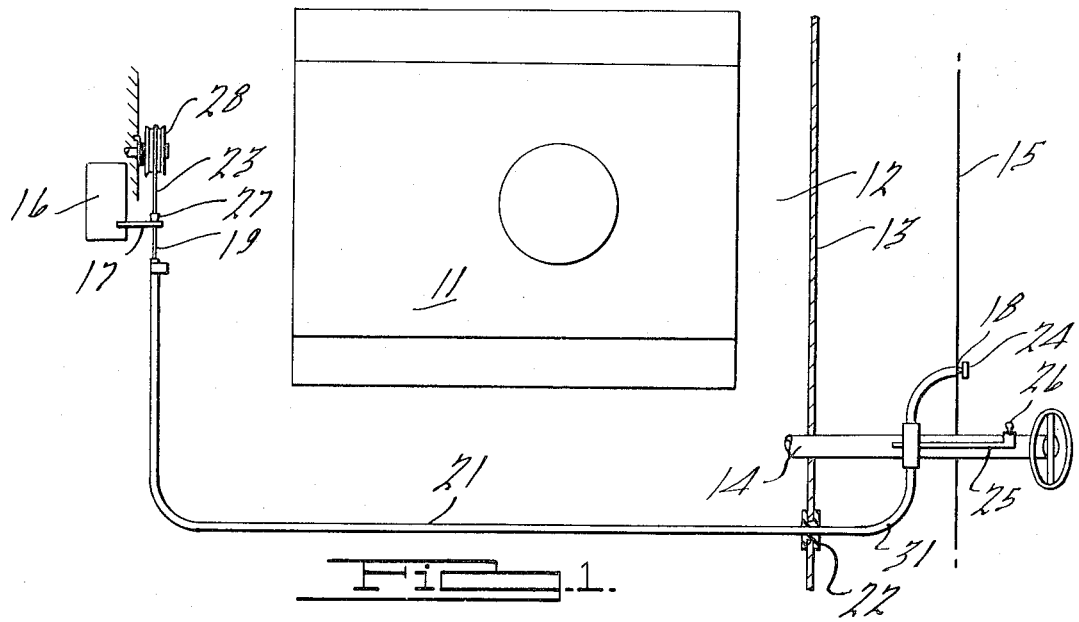
Fig. 1.
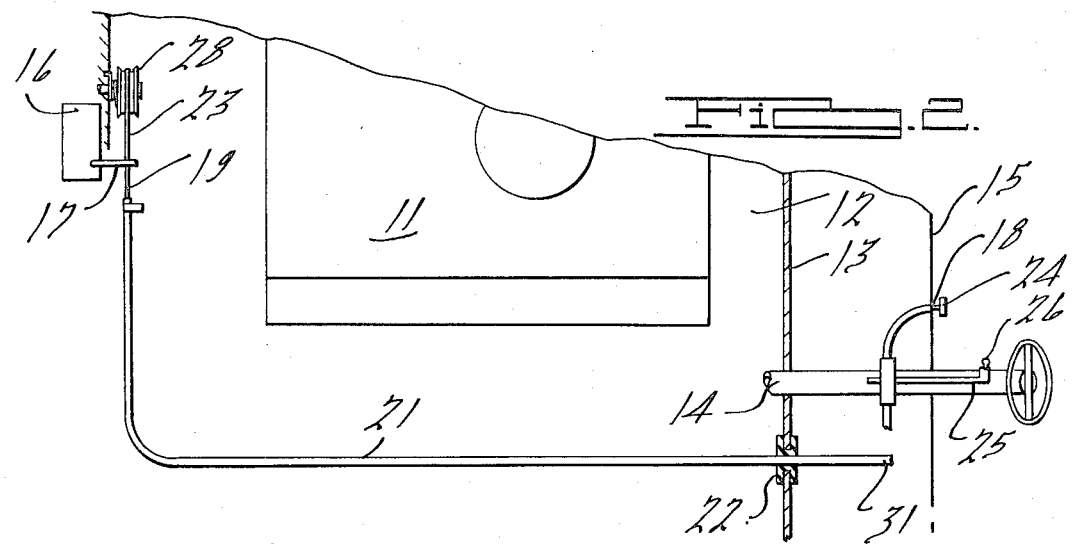
Fig. 2.
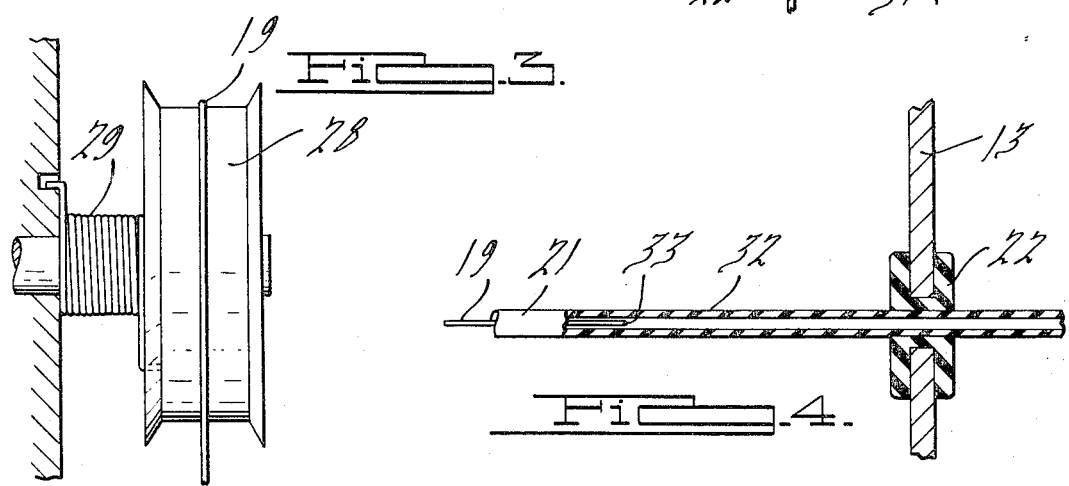
Fig. 3.
Fig. 4.

ANTI-THEFT CABLE RETRACTOR FOR HOOD LATCH RELEASE

BACKGROUND OF THE INVENTION

Locking of a vehicle engine compartment hood to protect the battery power source, in particular, is considered essential to protect the integrity of the vehicle systems. As disclosed in co-pending U.S. application Ser. No. 248,225, filed Apr. 27, 1972, by Harold C. Gebhard et al. for "Anti-Theft Hood Release," the latch mechanism release lever is coupled to a Bowden cable which extends from the engine compartment to the vehicle instrument panel. The cable is engaged by a blocking abutment which is a part of a rod extending from the ignition lock to the ignition switch. This arrangement permits the cable means to be actuated to open the hood only when the ignition key is in the "on" or "accessory" position.

It is possible, however, to bypass the locking feature by the use of wire cutters for cutting the cable means between the engine compartment wall and the ignition lock. The movable wire element of the cable means may then be gripped and pulled in latch mechanism releasing direction.

It is an object of the present invention to render the Bowden cable means inoperative in the event that it is severed in the manner set forth above.

SUMMARY OF THE INVENTION

The present invention comprises, in combination, a latch mechanism adapted to be mounted interiorly of a compartment, such as a vehicle engine compartment, to latch a closure, such as a hood, thereto. A Bowden cable means is coupled to the latch mechanism and extends exteriorly of the compartment through a wall of the latter. An operating means is coupled to the Bowden means exteriorly of the compartment, the operating means being operable to actuate the cable means in latch mechanism release direction and to limit movement of the cable means in a direction opposite to latch mechanism release direction. The combination further includes a key-operated locking means engaged with the cable means between the compartment wall and the operating means for blocking actuation of the cable means.

The combination is characterized in that a biasing means is coupled to the cable means contiguous to the latch mechanism. The biasing means normally urges the cable means in the direction opposite to latch mechanism release direction. The biasing means is effective to draw the cable means into the compartment upon the cable means being severed between the compartment wall and the key-operated locking means. The cable means is thus rendered inaccessible exteriorly of the engine compartment wall for latch mechanism release actuation.

DESCRIPTION OF THE DRAWING

Further features and advantages of the present invention will be made more apparent as this description proceeds, reference being had to the accompanying drawing, wherein:

FIG. 1 is a schematic diagram of a vehicle engine compartment disclosing the relationship of the mechanisms embodying the present invention;

FIG. 2 is a view in part similar to FIG. 1 illustrating the mechanisms in a disabled relationship;

FIG. 3 is an enlarged view of the biasing means for retracting the movable wire element of the Bowden cable in the event the cable is severed exteriorly of the engine compartment; and FIG. 4 is an enlarged fragmentary sectional view illustrating the retracted movable element relative to the engine compartment wall.

DETAILED DESCRIPTION OF THE INVENTION

Referring now to FIG. 1, there is diagrammatically shown a vehicle engine 11 positioned within an engine compartment 12. The engine compartment is in the usual manner separated from the vehicle passenger compartment by a firewall or dash panel 13. The steering wheel column 14 projects through the wall 13 into the passenger compartment, the column 14 in part projecting through or beneath the instrument panel designated by the line 15.

The conventional latch mechanism 16 is positioned at the front end of the engine compartment. The latch mechanism is adapted to have latching engagement with a keeper device (not shown) carried on an engine compartment closure or hood (not shown). The latch mechanism 16 has a release lever 17 to which one end 18 of the movable wire element 19 of a conventional Bowden wire or cable 21 is adapted to be coupled. The Bowden wire or cable 21 is routed within the engine compartment through a grommet 22 in the firewall or dash panel 13, under the steering column 14 and through the instrument panel 15. The other end 23 of the movable wire element 19 is provided with a push-pull button 24.

Mounted on the upper surface and extending longitudinally of the steering column 14 is a vehicle ignition switch activation rod 25. This rod 25 extends between a conventional column mounted key-operated device 26 for locking the vehicle against operation and an ignition switching device (not shown). Reference may be made to the co-pending application Ser. No. 248,225 cited above for details of construction of the manner in which the switch activation rod is used to lock the cable against push-pull operation so that it cannot be manipulated to release the latch mechanism.

Portion 23 of the movable wire element 19 of the cable 21 is coupled to the end of the release lever 17. This coupling is constructed and arranged so that a pull exerted on the button or knob 24 is transmitted through the movable wire element 19 to an abutment 27 on the cable portion 23. The abutment 27 abuts the release lever 17 to actuate the latter in latch release direction. In the opposite direction, the abutment 27 is freely movable relative to the release lever 17.

The end of the movable wire element 19 beyond the abutment 27 bearing portion 23 is connected to a reel 28 which is spring loaded by a spring 29. The reel is biased in a direction to exert a windup pull on the movable wire element 19 in latch nonreleasing direction.

A latch mechanism cable release device, even if provided with a lock, is most vulnerable in the area 31 between the steering column 14 and the grommet 22 through which it passes through the firewall 13. Even if the cable 21 is provided with an armored sheath 32, it can be cut by a strong pair of wire cutters. If cut between the firewall or dash panel 13 and the locking device, the movable element of the cable may be grasped by a pair of pincers and the latch mechanism released to permit access to the engine compartment and the accessories such as the vehicle battery.

With the structure embodying the present invention, if the cable is severed in a vulnerable area 31 as indicated in FIG. 2, the movable element 19 will be wound upon the reel 28 so that it is pulled through the dash panel 13, as shown in FIG. 4. In this condition, the severed end 33 of the wire element 19 of the cable 21 is within the engine compartment and cannot be manipulated to pull the cable in latch mechanism releasing direction. It then becomes necessary for the would-be thief to attempt to release the latch mechanism from beneath the vehicle. In most cases, this would take more time than the average thief would care to spend in attempting to get into the engine compartment.

It is to be understood that the invention is not limited to the exact construction illustrated and described above, but that various changes and modifications may be made without departing from the spirit and scope of the invention as defined by the following claims:

I claim:

1. In combination,
a latch mechanism adapted to be mounted interiorly of a compartment to latch a closure thereto,
Bowden cable means coupled to the latch mechanism and extending exteriorly of the compartment through a wall of the latter,
operating means coupled to the Bowden cable means exteriorly of the compartment,
the operating means being operable to actuate the cable means in latch mechanism release direction and to limit movement of the cable means in a direction opposite to latch mechanism release direction,
and key-operated locking means engaged with the cable means between the compartment wall and the operating means for blocking actuation of the cable means,
characterized in that a biasing means is coupled to the cable means contiguous to the latch mechanism,
the biasing means normally urging the cable means in a direction opposite to latch mechanism release direction,
the biasing means being effective to draw the cable means into the compartment upon the cable means being severed between the compartment wall and the key-operated locking means thereby rendering the cable means inaccessible for latch mechanism release.

2. The combination, according to claim 1, in which:
the Bowden cable means comprises a movable wire element encased in a sheath,
the movable wire element being coupled at its end within the compartment to a latch mechanism release lever and at its end outside the compartment to a latch mechanism release handle.

3. In combination, according to claim 2, in which:
the biasing means comprises a spring-loaded reel to which the movable wire element is coupled,
an abutment means is positioned on the movable wire element on the reel side of the latch mechanism for engagement with a release lever,
the abutment means causing release of the latch mechanism upon the latch mechanism lever being pulled to move the movable wire element against the resistance of the spring loaded reel.

4. In combination, according to claim 1, in which:
the movable wire element upon the cable means being severed being drawn around the spring loaded reel.

5. In combination, according to claim 1, in which:
the biasing means comprises a spring-loaded reel to which the movable wire element is coupled,
an abutment means is positioned on the movable wire element on the reel side of the latch mechanism for engagement with a release lever,
the abutment means causing release of the latch mechanism upon the latch mechanism release lever being pulled to move the movable wire element against the resistance of the spring loaded reel.

6. In combination, according to claim 6, in which
the movable wire element upon the cable means being severed being drawn around the spring loaded reel.

* * * * *